United States Patent [19]

Jeanson

[11] Patent Number: 4,834,088
[45] Date of Patent: May 30, 1989

[54] SHOCK ABSORBER FOR VEHICLES WITH PNEUMATIC SUSPENSION, MORE ESPECIALLY FOR HEAVY VEHICLES

[75] Inventor: Rene H. Jeanson, Fontenay Le Comte, France

[73] Assignee: Jimecal, Fontenay Le Comte, France

[21] Appl. No.: 162,619

[22] Filed: Mar. 1, 1988

[30] Foreign Application Priority Data

Mar. 2, 1987 [FR] France .............. 87 02784

[51] Int. Cl.$^4$ .............. B60G 15/12; B60G 17/08; F16F 9/50

[52] U.S. Cl. .............. 188/299; 188/269; 188/281; 188/314; 188/315; 188/318; 188/322.14; 267/122; 267/64.15; 267/64.23; 280/708; 280/714

[58] Field of Search .............. 188/299, 269, 322.13, 188/322.14, 322.15, 311–319, 298, 281, 282; 267/64.15, 14 64.27, 122, 64.11; 280/708, 714, DIG. 1

[56] References Cited

U.S. PATENT DOCUMENTS

| | | | |
|---|---|---|---|
| 2,122,407 | 7/1938 | Chisholm, Jr. | 188/318 |
| 2,948,357 | 8/1960 | Cookson | 188/322.14 |
| 3,103,993 | 9/1963 | Gies | 188/318 X |
| 3,532,194 | 10/1970 | Jackson | 188/299 |
| 3,547,465 | 12/1970 | Hoffmann et al. | 280/708 |
| 3,991,863 | 11/1976 | Lee | 188/318 X |
| 4,226,408 | 10/1980 | Tomita et al. | 267/64.23 X |
| 4,234,172 | 11/1980 | Takahashi | 280/708 X |
| 4,311,302 | 1/1982 | Heyer et al. | 267/64.23 |
| 4,502,673 | 3/1985 | Clark | 188/318 X |
| 4,579,199 | 4/1986 | Nakayama et al. | 188/299 |
| 4,588,171 | 5/1986 | Stephens | 188/318 X |
| 4,623,049 | 11/1986 | Warren | 188/322.14 X |
| 4,635,906 | 1/1987 | Buma | 188/299 X |
| 4,732,244 | 3/1988 | Verkuylen | 188/318 |
| 4,752,062 | 6/1988 | Domenichimi | 188/299 X |

FOREIGN PATENT DOCUMENTS

| | | |
|---|---|---|
| 1430051 | 7/1972 | Fed. Rep. of Germany . |
| 2915012 | 11/1980 | Fed. Rep. of Germany ............ 188/322.14 |
| 1298412 | 6/1962 | France . |
| 0290249 | 12/1986 | Japan .............. 188/322.14 |
| 736431 | 9/1955 | United Kingdom .............. 188/299 |

*Primary Examiner*—Douglas C. Butler
*Attorney, Agent, or Firm*—Finnegan, Henderson, Farabow, Garrett & Dunner

[57] ABSTRACT

A shock absorber for vehicles with pneumatic suspension, particularly for use with heavy vehicles, of the type comprising a cylinder, a rod movable axially in the cylinder, a piston carried by the rod and dividing the cylinder into a cylindrical chamber and an annular chamber, a pressurized fluid filling the cylindrical and annular chambers, a first circuit for allowing the fluid to flow from the annular chamber to the cylindrical chamber when the shock absorber is working under extension, a second circuit for allowing the fluid to flow from the cylindrical chamber to the annular chamber when the shock absorber is working under compression, a pressurized fluid reservoir connectable to the cylindrical and annular chambers and flow regulators mounted in the first and second circuits, the flow regulators being controlled by the fluid pressure against the action of the pressure of the compressed air of the pneumatic suspension of the vehicle.

16 Claims, 4 Drawing Sheets

SHOCK ABSORBER FOR VEHICLES WITH PNEUMATIC SUSPENSION, MORE ESPECIALLY FOR HEAVY VEHICLES

BACKGROUND OF THE INVENTION

The present invention relates to a shock absorber for vehicles with pneumatic suspension, particularly for heavy vehicles, of the type comprising a cylinder, a rod movable axially in the cylinder, a piston carried by the rod and dividing the cylinder into a cylindrical chamber and an annular chamber, a pressurized fluid filling the cylindrical and annular chambers, a first circuit for allowing the fluid to flow from the annular chamber to the cylindrical chamber when the shock absorber is working under extension, a second circuit for allowing the fluid to flow from the cylindrical chamber to the annular chamber when the shock absorber is working under compression, a pressurized fluid reservoir connectable to the cylindrical and annular chambers and flow regulators mounted in the first and second circuits for controlling the flow of pressurized fluid therein. These flow regulators being controlled by the compressed air of the corresponding pneumatic suspension of the vehicle.

Heavy vehicles such as trucks, trailers and semi-trailers are called on to withstand loads which may vary in very wide proportions depending on whether they are used empty or with maximum load.

Most of them are equipped with pneumatic suspensions suitably fulfilling their function whatever the load transported, the pressure of the compressed air in the bellows or diaphragms of the suspensions being proportional to said load.

On the other hand, the shock absorbers of these different heavy vehicles have constant shock absorbing characteristics and can only correctly damp the oscillations of the suspensions for a given load.

SUMMARY OF THE INVENTION

The present invention proposes solving this problem and, for this, it provides a shock absorber of the above mentioned type in which the flow regulators comprise two coaxial slide valves movable in translation, these slide-valves being applied one against the other when the shock absorber is at rest or is working under compression.

This shock absorber thus has a shock absorbing curve which depends on the load supported by the suspensions with which it is associated. It may therefore operate efficiently whatever the value of this load, which is not the case with present day shock absorbers.

Preferably, the slide-valve of the second circuit has two opposite extensions extending coaxially with the slide-valve of the first circuit, the extension which is opposite the slide-valve of the first circuit abutting against a stop when the shock absorber is at rest or working under extension.

Furthermore, the first and second circuits each have a restriction orifice whose opening is controlled by the corresponding slide-valve.

So that the flow of pressurized fluid in both circuits is substantially insensitive to the variations of viscosity of said fluid (these variations depending largely on the ambient temperature), the restriction orifices of the first and second circuits are advantageously thin wall orifices. The operation of the shock absorber therefore does not risk being disturbed during periods of intense cold.

To take into account the fact that the damping force of the shock absorber is much higher under traction than under compression, the sections of the slide-valve and of the restriction orifice of the second circuit are respectively greater than the sections of the slide-valve and the restriction orifice of the first circuit.

Furthermore, in order to damp the very slow oscillations of the suspension, it is desirable for the restriction orifice of the second circuit not to be completely closed when the shock absorber is at rest.

In a first embodiment of the invention the slide-valve of the first circuit is urged in the direction of the other slide-valve by a linkage on which is exerted the pressure of the compressed air of the corresponding pneumatic suspension of the vehicle.

More precisely, the linkage includes a piston secured to a rod movable axially in a cylinder, a link articulated to the free end of the rod, and a lever articulated to the link, this lever being mounted for pivoting about a fixed axis and having a cam bearing against the slide-valve of the first circuit, the pressure of the compressed air exerting its action on the face of the piston which is turned towards the rod.

In a second embodiment of the invention, the slide-valve of the first circuit is urged towards the other slide-valve by a membrane against which is exerted the pressure of the compressed air of the corresponding pneumatic suspension of the vehicle. More precisely, it penetrates into an orifice formed in the center of a wall against which the membrane bears and is adapted to project from this orifice so as to move the membrane away from the wall when the shock absorber is working under extension or under compression.

Advantageously, the membrane is fixed by its periphery between the wall and a cover defining therewith a chamber in which is exerted the pressure of the compressed air of the pneumatic suspension.

With this arrangement, the shock absorber may be constructed with a simple and compact structure.

So that the shock absorber has a satisfactory shock absorbing curve, it is preferable for the wall to be concave, for example in the form of a spherical skull cap and has a groove in the vicinity of the periphery of the membrane. It is further desirable for the membrane to be reinforced so as not to extend under the pressure of the compressed air of the pneumatic suspension and/or under the action of the piston of the first circuit.

BRIEF DESCRIPTION OF THE DRAWINGS

Two embodiments of the present invention will be described hereafter by way of non limitative examples with reference to the accompanying drawings in which.

DESCRIPTION OF THE EMBODIMENTS

Figure 1:
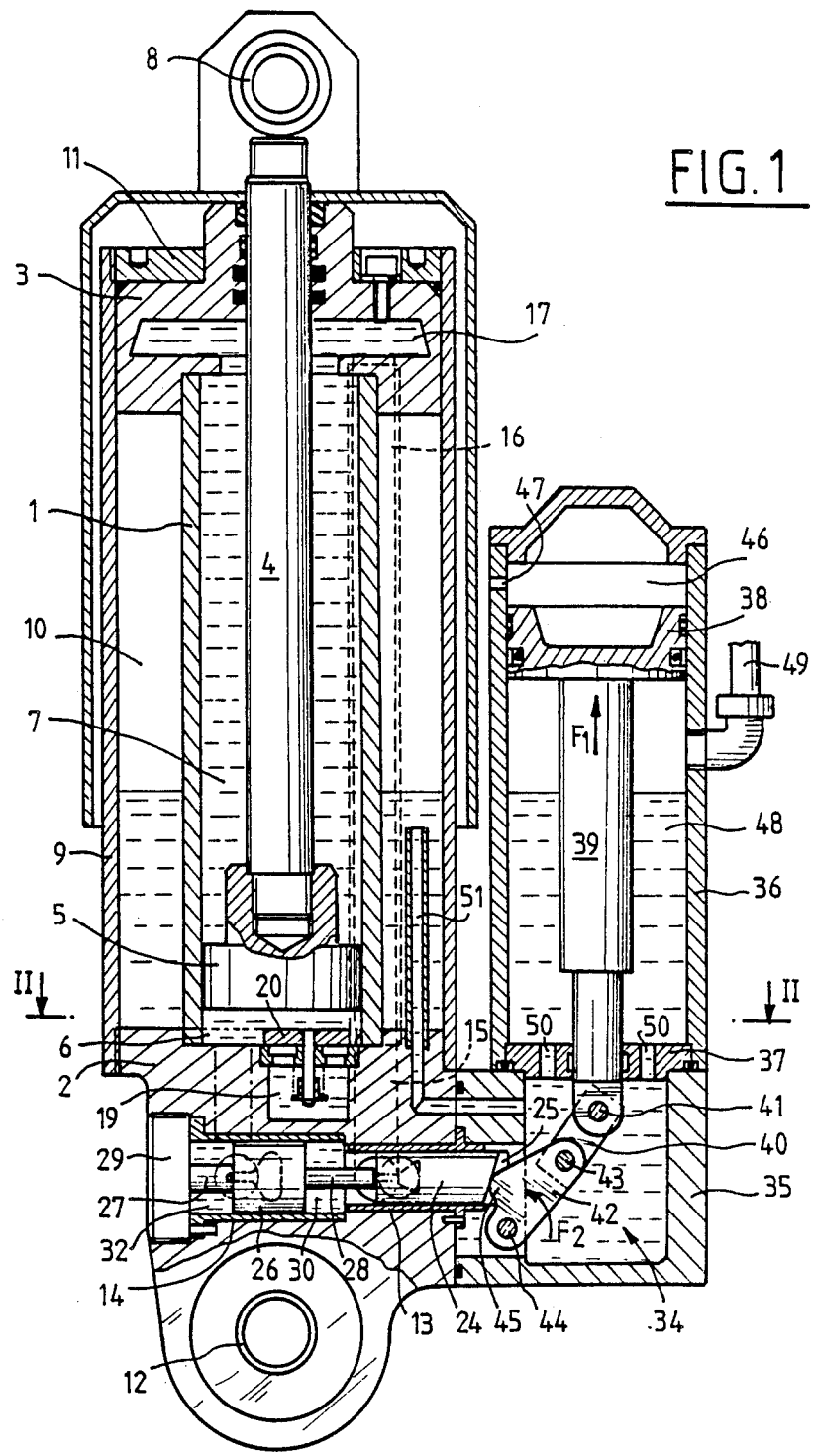
FIG. 1 is a vertical sectional view of a shock absorber according to the invention, this section being made through line I—I of FIG. 2 and showing the piston of the linkage in the top position.

The shock absorber shown in FIG. 1 is intended to equip heavy vehicles having pneumatic suspensions. It comprises a cylinder 1 whose lower end is fixed to a block 2 and whose upper end is closed by a bearing 3, a rod 4 movable axially in the cylinder 1, and a piston 5 provided at the lower end of rod 4, this piston dividing the cylinder into a cylindrical chamber 6 and an annular chamber 7.

Rod 4 passes through bearing 3 in which it may sealingly slide and has at its free end an articulation device 8 for connecting the shock absorber to the chassis (not shown) of a heavy vehicle.

A cylinder 9 extending coaxially with cylinder 1 forms therewith a reservoir 10 containing a pressurized fluid, preferably oil, for filling the cylindrical chamber 6 and the annular chamber 7.

As shown in FIG. 1, the lower end of cylinder 9 is fixed to block 2 whereas its upper end bears against the side wall of bearing 3 and receives a closure nut 11.

Block 2 supports at its lower end an articulation device 12 for connection to the suspension arm (not shown) of the corresponding pneumatic suspension of the heavy vehicle. It is provided with a stepped bore enclosing a socket 13 in its smallest section part and a socket 14 in its other part.

Figure 2:
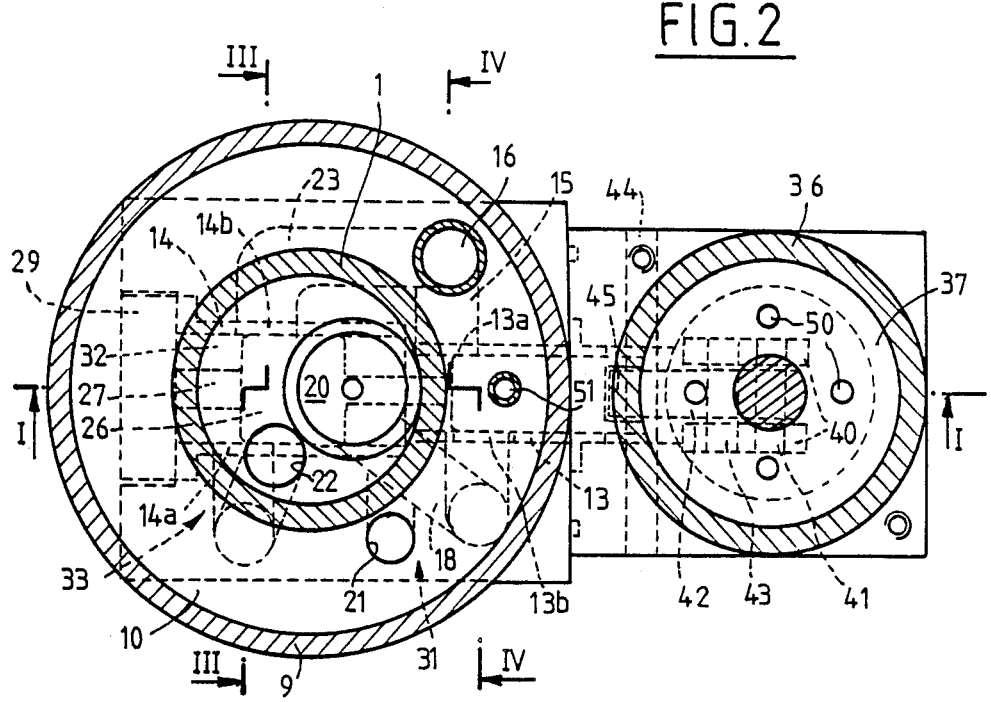
FIG. 2 is a sectional view through line II-II of FIG. 1.
Figure 4:
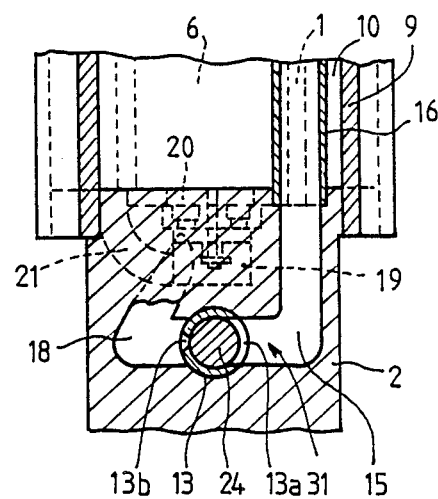
FIG. 4 is a sectional view through line IV-IV of FIG. 2.

Socket 13 has a feed orifice 13a (See FIGS. 2 and 4) situated in the extension of a duct 15 formed in block 2 and connected to a vertical tube 16 extending into the reservoir 10, this tube opening into an annular cavity 17 formed in bearing 3 and communicating with the annular chamber 7. It also includes a restriction orifice 13b situated in the extension of a duct 18 formed in block 2 and extending to a cavity 19 connected to the cylindrical chamber 6 via a non return valve 20 mounted so as to allow a fluid flow solely in the direction going towards the cylindrical chamber 6, Cavity 19 being further connected to reservoir 10 by a duct 21.

Figure 3:
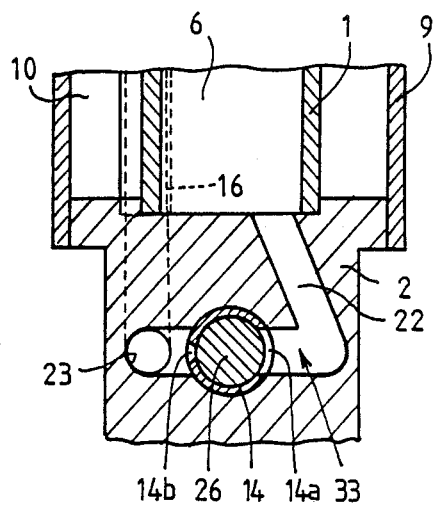
FIG. 3 is a sectional view thorugh line III-III of FIG. 2.

As for socket 14, it has a feed orifice 14a (See FIGS. 2 and 3) situated in the extension of a duct 22 formed in block 2 and extending into the cylindrical chamber 6. It also includes a restriction orifice 14b situated in the extension of a duct 23 formed in block 2 and connected to the vertical tube 16.

Referring more particularly to FIG. 1, it will be further noted that socket 13 contains a cylindrical slide-valve 24 having, at its end the furthest away from socket 14, a groove 25 with a slanting bottom, whereas socket 14 contains a cylindrical slide-valve 26 having two opposite extensions 27, 28 extending coaxially with slide-valve 24.

It will also be noted that threaded plug 29 retains socket 14 in the stepped bore of block 2 and serves as a stop for the extension 27 of slide-valve 26 which itself serves as a stop for slide-valve 24 through its extension 28. More precisely, when the slide-valves 24, 26 bear against their respective stop, as shown in FIG. 1, the first one leaves the feed orifice 13a open and completely closes the restriction orifice 13b, whereas the second one leaves the feed orifice 14a open but does not completely close the restriction orifice 14b.

Figure 5:
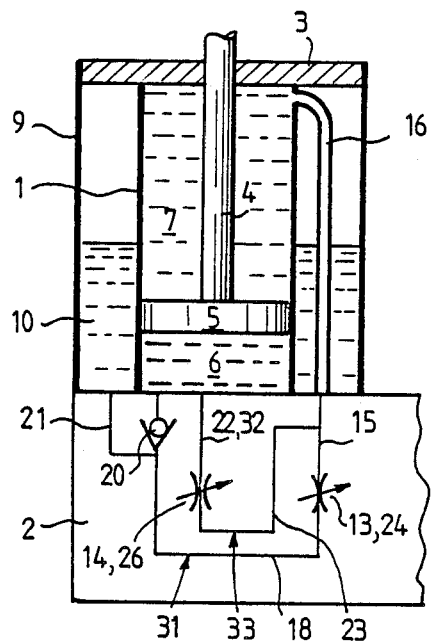
FIG. 5 is a diagram showing the two pressurized fluid circuits when the shock absorber is at rest.

To facilitate understanding of the operation of the shock absorber which will be described hereafter with reference to FIGS. 5 to 7, the following should be clearly stated:

. tube 16, duct 15, chamber 30 formed between slide-valves 24 and 26, duct 18 and cavity 19 form a first circuit 31 for allowing the pressurized fluid to flow from the annular chamber 7 to the cylindrical chamber 6 when the shock absorber is working under extension; and . duct 22, chamber 32 formed between slidevalve 26 and plug 29, duct 23 and tube 16 form a second circuit 33 for allowing the pressurized fluid to flow from the cylindrical chamber 6 to the annular chamber 7 when the shock absorber is working under compression.

In accordance with the invention, slide-valves 24, 26 are movable in transition in sockets 13, 14 by the pressurized fluid which acts against the action of the pressure of the compressed air of the corresponding pneumatic suspension of the heavy vehicle.

In the example shown in FIG. 1, the shock absorber includes a linkage 34 housed partially in a casing 35 fixed to block 2 and partially in a cylinder 36 separated from casing 35 by a bearing 37. This linkage comprises a piston 38 fixed to a rod 39 movable axially in cylinder 36, a link 40 pivotally mounted on a pin 41 provided at the free end of rod 39 which passes through bearing 37 and penetrates into casing 35, and a lever 42 pivotally mounted on a pin 43 on link 40, this lever being mounted for pivoting about a pin 44 fixed to casing 35 and having a cam 45 bearing against the slanting bottom of groove 25 of the slide-valve 24.

In the embodiment shown, cam 45 is shaped as a gear tooth with involute form so as to roll without friction on the bottom of groove 25 of slide-valve 24. It could however also be replaced by a roller.

Piston 38 separates cylinder 36 into a cylindrical chamber 46 connected to the atmosphere through an orifice 47 and an annular chamber 48 connected to the bellows or to the diaphragm (not shown) of the pneumatic suspension of the heavy vehicle through a duct 49.

Furthermore, bearing 37 has channels 50 for communicating the annular chamber 48 of cylinder 36 with the inside of casing 35 which is itself connected to reservoir 10 through a duct 51.

The pressure of the compressed air contained in the bellows or diaphragm of a pneumatic suspension is proportional to the load exerted thereon. The compressed air which is present in the annular chamber 48 of cylinder 36 exerts then on the piston 38 a force directed in the direction of arrow F1 proportional to the load exerted on the suspension associated with the shock absorber. Simultaneously, the piston rod 39 exerts a tractive force on link 40, which, by urging lever 42 to pivot about pin 44 in the direction of arrow F2, maintains cam 45 bearing against the groove 25 of slide-valve 24.

The bearing force of cam 45 against the slide-valve 24 depends on the pressure of the compressed air in the pneumatic suspension and on the lever arm formed by the line passing through the center of pins 41, 43 with the center of pin 44. It is clear from FIG. 1 that this lever arm is minimum when slide-valves 24, 26 bear against their respective stops 28, 29 and increases first of all very rapidly then very slowly when slide-valve 24 moves against the force which cam 45 exerts thereon.

The operation of the shock absorber of the invention will now be described with reference more particularly to FIGS. 5 to 7.

1. Case where the shock absorber is at rest (FIG. 5).

When the shock absorber is at rest, slide-valves 24 and 26 bear against their respective stops, as shown in FIG. 1. Slide-valve 24 completely closes the restriction orifice 13b and prevents any flow of fluid between ducts 15 and 16. For its part, slide-valve 26 does not completely close the restriction orifice 14b and may allow a small fluid flow in circuits 31 and 33 so that the curves representing the shock absorbing forces as a function of the speed of movement of piston 5 pass through the zero point.

It will be noted that slide-valve 26 could, if required, completely close the restriction orifice 14b. In this case, the above mentioned curves would have their origin above the zero point, the corresponding shift in height depending on the value of the above mentioned lever arm.

Figure 6:
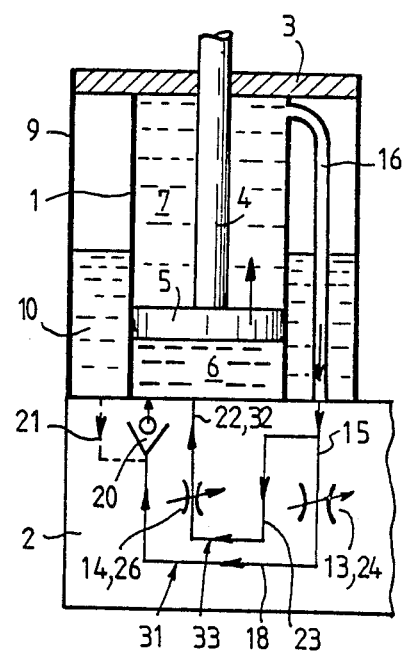
FIG. 6 is a diagram showing the two circuits when the shock absorber is working under extension.

2 Case where the shock absorber is working under extension (FIG. 6).

The shock absorber is in this case subjected to an external action tending to extend it. The volume of the annular chamber 7 therefore tends to decrease whereas the pressure of the fluid in chamber 30 of the first circuit 31 tends to increase.

When this pressure is sufficient to overcome the bearing force of cam 45 on slide-valve 24, this latter moves away from extension 28 of slide-valve 26 and allows the fluid contained in chamber 30 to flow through the duct 18 of the first circuit 31. Since the pressure of the fluid in this latter is higher than that of the fluid in the cylindrical chamber 6, non-return valve 20 opens and allows the fluid contained in chamber 7 to flow into the cylindrical chamber 6.

Since the section of chamber 7 is less than that of chamber 6, this latter may however be filled through a complementary supply of fluid delivered by the reservoir 10, the flow of this make up supply being shown symbolically by the broken line in FIG. 6.

Meanwhile, slide-valve 26 remains in abutment against plug 29 and therefore only allows a very small flow of fluid from the annular chamber 7 to the cylindrical chamber 6 through the second circuit 33.

3. Case where the shock absorber is working under compression (FIG. 7)

The shock absorber is in this case subjected to an external action tending to shorten it. The volume of the cylindrical chamber 6 therefore tends to decrease whereas the pressure of the fluid in chamber 32 of the second circuit 33 tends to increase.

When this pressure is sufficient to overcome the bearing force of cam 45 on slide-valve 24, slidevalve 26 moves away from plug 29 and takes slide-valve 24 with it. The fluid contained in chamber 6 may then flow through the second circuit 33 towards chamber 7.

Figure 7:
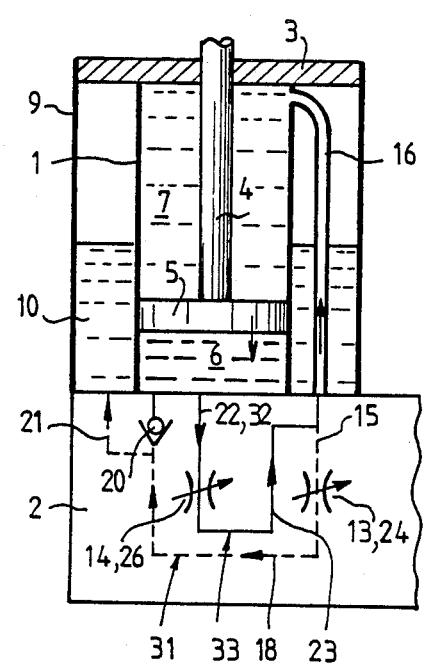
FIG. 7 is a diagram showing the two circuits when the shock absorber is working under compression.

Since the whole of the fluid displaced cannot be received in chamber 7, the excess fluid flows through the restriction orifice 13b which slide-valve 24 has opened when moving under the action of slide-valve 26, and flows into reservoir 10 through the first circuit 31, the flow of excess fluid being shown symbolically by the broken line in FIG. 7.

It will be noted here that the damping force of the shock absorber increases with the flow of pressurized fluid through the restriction orifices 13b, 14b (i.e. with the speed of movement of piston 5) and that for a given value of the pressure of the compressed air of the pneumatic suspension there corresponds a balanced position of slide-valve 24 (case of traction) or of slide-valve 26, (case of compression) for each of the values of said speed.

It will also be noted that the damping force of the shock absorber is much greater under traction than under compression and that it is to take this characteristic into account that the sections of slide-valve 26 and of the restriction orifice 14b of the second circuit 32 are respectively greater than the sections of slide-valve 24 and of the restriction orifice 13b of the first circuit 31.

It will again be mentioned that the trend of the damping curves of the shock absorber can be modified by modifying the shape of the restriction orifices 13b, 14b, the value of the lever arm formed by the line passing through the center of pins 41, 43 with the center of pin 44, the distance separating pins 41, 43 or that separating pins 43, 44.

Figure 8:
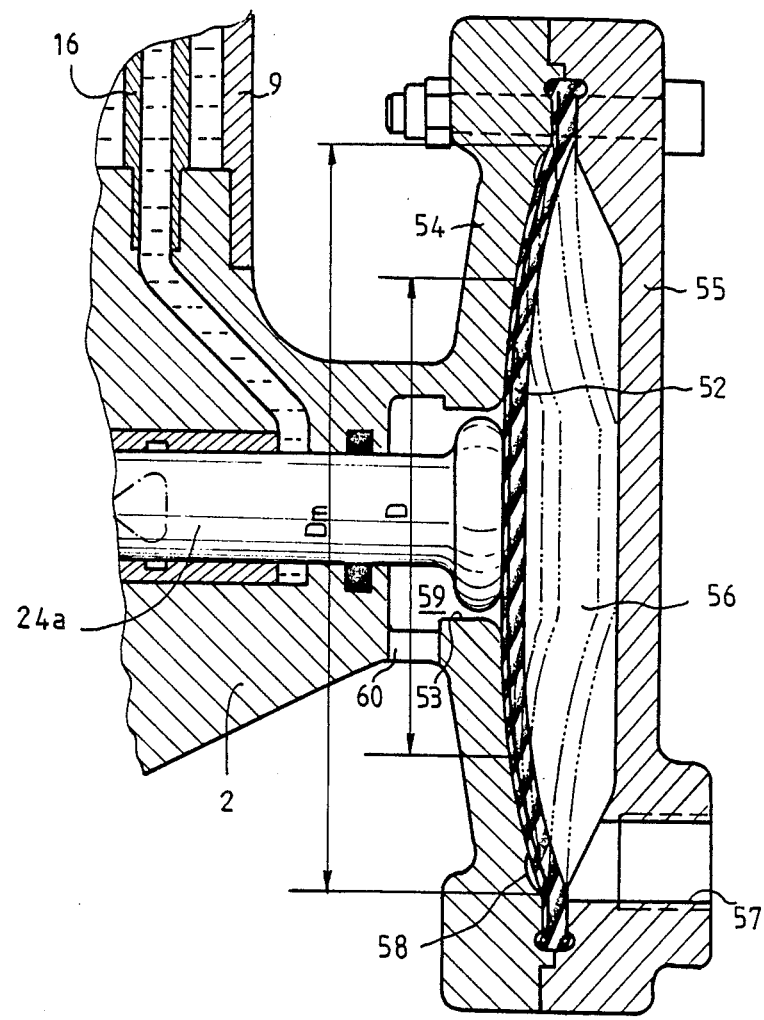
FIG. 8 is a partial vertical sectional view of a shock absorber in a second embodiment.

The shock absorber shown in FIG. 8 differs from that just described by the fact that linkage 34 has been replaced by a membrane 52 and slide-valve 24 has been replaced by a slightly longer slide-valve 24a having a swelling at its end opposite slide-valve 26.

Slide-valve 24a extends into an orifice 53 formed at the center of a circular wall 54 integral with block 2 whereas membrane 52 is fixed by bolts, at its periphery, between wall 54 and a cover 55 defining therewith a chamber 56 connected, in line with an orifice 57, to the bellows or diaphgram (not shown) of the pneumatic suspension of the heavy vehicle.

Under the pressure of the compressed air of the suspension, membrane 52 is applied against the swelling of slide-valve 24a and against wall 54 when the shock absorber is at rest. On the other hand, when it is working under traction or under compression, slide-valve 24a forces membrane 52 to move all the further from the wall the longer its stroke. By way of example, the membrane has been shown in FIG. 8 with a continuous line in a position in which the slide-valve 24a has not pushed it and with broken lines in four different positions in which the slide-valve 24 has caused it to take on four different deformations.

In the embodiment envisaged here, wall 54 is in the form of a spherical skull cap. Since its shape conditions the resistance to driving in of the membrane and influences the shock absorbing curve of the shock absorber, it could then have a different concave profile so as to obtain a particular shock absorbing curve.

It will be further noted that wall 54 includes a groove 58 in the vicinity of the periphery of the membrane, which allows the detachment diameter D thereof to reach its maximum value Dm more rapidly. In FIG. 8, the diameter D shown is the detachment diameter corresponding to the smallest deformation shown of the membrane.

It is of course indispensable for the membrane 52 not to be able to extend under the pressure of the compressed air of the suspension and/or under the action of piston 24a. To satisfy this requirement, it is preferably made from a rubber material greatly strengthened by steel wires or glass fibers.

It will be further noted that the part of slide-valve 24a which carries the swelling is housed in a chamber 59 communicating with the outside through an orifice 60 formed in block 2, this chamber providing venting of the face of the membrane which is outside chamber 56.

For the sake of completeness, cover 55 may advantageously limit the free movement of the membrane and so of slide-valve 24a.

The operation of the shock absorber in the second embodiment is obvious and so it will not be described here.

What is claimed is:

1. A hydraulic shock absorber for use with a vehicle having a pneumatic suspension system operating under compressed air comprising a cylinder, a rod movable axially in the cylinder, a piston carried by the rod and dividing the cylinder into a cylindrical chamber and an annular chamber, a pressurized fluid filling the cylindrical and annular chambers, a first fluid circuit for allowing the fluid to flow from the annular chamber to the cylindrical chamber when the shock absorber is working under extension, a second fluid circuit for allowing the fluid to flow from the cylindrical chamber to the annular chamber when the shock absorber is working under compression, a pressurized fluid reservoir connected to the cylindrical and annular chambers, means for receiving compressed air under pressure from a pneumatic suspension system and first and second flow regulators located in said first and second fluid circuits for controlling the flow of the pressurized fluid therein, said first and second flow regulators comprising, respectively, first and second coaxial slidevalves slidable in translation and relative to each other in first and second coaxial sockets between a first position when the shock absorber is at rest and the flow of fluid in said first and second circuits is essentially prevented, a second position where the slide-valves permit fluid to flow in said first circuit when the shock absorber is working under extension and a third position where the slide-valves permit fluid to flow in said second circuit when the shock absorber is working under compression, said slide-valves being urged into said first position by the pressure of the compressed air, the pressure generated in the pressurized fluid during extension and compression of the absorber working against the pressure of the compressed air to move the slide-valves to said second and third positions respectively.

2. The shock absorber of claim 1, wherein the first slide-valve comprises a first piston slidably mounted in said first socket, and the second slide valve comprises a second piston slidably mounted in said second socket that is coaxial with the first socket, said second piston having two opposite extensions extending coaxially from both sides of the piston, one of which extends towards one side of the first piston creating a first annular chamber between the pistons when the extension and the first piston are in contact with each other and the other extension extending from the other side of the second piston towards a stop located on an end of the second socket opposite from the first socket and creating a second annular chamber between said other side of the second piston and the stop when the extension is in contact with the stop, the pressure of the compressed air acting on the other side of the first piston to bias the valves toward said first position where the extensions of the second piston are in contact with the stop and the first piston.

3. The shock absorber of claim 2, wherein the first circuit communicates with the first annular chamber between said pistons whereby the pressure generated in the pressured fluid during extension of the shock absorber keeps said other extension of the second piston against the stop and tends to move the first piston away from the second piston against the pressure of the compressed air to place said valves in the second position and wherein the second circuit communicates with the second annular chamber between the second piston and the stop whereby the pressure generated in the pressurized fluid during compression of the shock absorber tends to move both said pistons away from the stop against the pressure of the compressed air to place said valves in the third position.

4. The shock absorber of claim 3, wherein the first and second circuit each have a restriction orifice whose opening is controlled by movement of the corresponding slide-valve.

5. The shock absorber of claim 4, wherein the restriction orifices of the first and second circuit are thin wall orifices.

6. The shock absorber of claim 4, wherein the volume of the second annular chamber and the restriction orifice of the second circuit are respectively greater than the volume of the first annular chamber and of the restriction orifice of the first circuit.

7. The shock absorber of claim 4, wherein the restriction orifice of the second circuit is not completely closed when valves are in the first position and the shock absorber is at rest.

8. The shock absorber of claim 1, wherein the first slide-valve is urged in the direction of the second slide-valve to place them in the first position by a linkage on which is exerted the pressure of the compressed air.

9. The shock absorber of claim 8, wherein the linkage includes an air cylinder piston fixed to one end of a rod movable axially in the air cylinder, a link articulated to the free end of the rod and a lever articulated to the link, said lever being pivotally connected about a fixed pin and carrying a cam bearing against the first slide-valve, the pressure of the compressed air exerting its action on the side of the piston adjacent the rod.

10. The shock absorber of claim 9, wherein the fluid reservoir and the chamber of said air cylinder are connected together so as to pressurize the fluid in the reservoir.

11. The shock absorber of claim 1, wherein the first slide-valve is urged in the direction of the second slide-valve by a membrane against which is exerted the pressure of the compressed air.

12. The shock absorber of claim 11, wherein the membrane rests against a wall having an orifice at the center thereof under the pressure of the compressed air and the first slide valve has an arm that projects through the orifice so as to move the membrane away from the wall when the shock absorber is working under extension or under compression.

13. The shock absorber of claim 12, wherein the membrane is fixed at its periphery between the wall and a cover defining therein a chamber in which the pressure of the compressed air is exerted.

14. The shock absorber of claim 12, wherein the wall is concave and is formed with a groove in the vicinity of the periphery of the membrane.

15. The shock absorber of claim 14, wherein the wall is in the form of a spherical cap.

16. The shock absorber of claim 14, wherein the membrane is reinforced so as not to distort under the pressure of the compressed air or under the action of the arm of the first slide valve.

* * * * *